United States Patent [19]
Becker et al.

[11] 3,973,785
[45] Aug. 10, 1976

[54] SLED

[75] Inventors: Klaus Becker, Wetter; Karl-Heinz Wolsi, Bochum-Langendreer; Bernd Purath, Wetter, all of Germany

[73] Assignee: Demag Aktiengesellschaft, Duisburg, Germany

[22] Filed: Jan. 13, 1975

[21] Appl. No.: 540,646

[30] Foreign Application Priority Data
Jan. 30, 1974 Germany............................ 2404337

[52] U.S. Cl. ..................................... 280/11; 188/8; 280/12 AB
[51] Int. Cl.² ........................................ B62B 13/18
[58] Field of Search ............... 188/8; 280/11, 12 AB, 280/9

[56] References Cited
UNITED STATES PATENTS

| 630,987 | 8/1899 | Nylander | 280/11 |
|---|---|---|---|
| 1,614,137 | 1/1927 | Limbers | 188/8 |
| 2,105,308 | 1/1938 | Brickner | 188/8 |
| 3,734,523 | 5/1973 | Field | 188/8 X |

FOREIGN PATENTS OR APPLICATIONS

| 2,233,097 | 1/1973 | Germany | 188/8 |
|---|---|---|---|
| 561,125 | 10/1932 | Germany | 280/12 AB |
| 690,915 | 6/1965 | Italy | 188/8 |
| 18,850 | 4/1909 | Norway | 188/8 |
| 52,627 | 2/1911 | Switzerland | 280/11 |

*Primary Examiner*—George E. A. Halvosa
*Attorney, Agent, or Firm*—Mandeville and Schweitzer

[57] ABSTRACT

A dual braking system is provided for high speed sleds in which the center of gravity of the operator is placed between fore and aft brake shoes, which are operated simultaneously by the operator without the need for shifting position. Thus, the brake system is effective even though the operator is naturally shifted forward by the braking action. Also included in the brake system is a wheel assembly, which may be operated by the single brake lever to accommodate fast acceleration. Operating the brake lever to shift the wheel assembly into effective operative shifts the center of gravity of the operator over the wheel assembly. The dual brake shoes pivot around horizontal axes and are disposed adjacent the longitudinal centerline of the sled to avoid lateral deflection of the sled when the brakes are applied.

3 Claims, 4 Drawing Figures

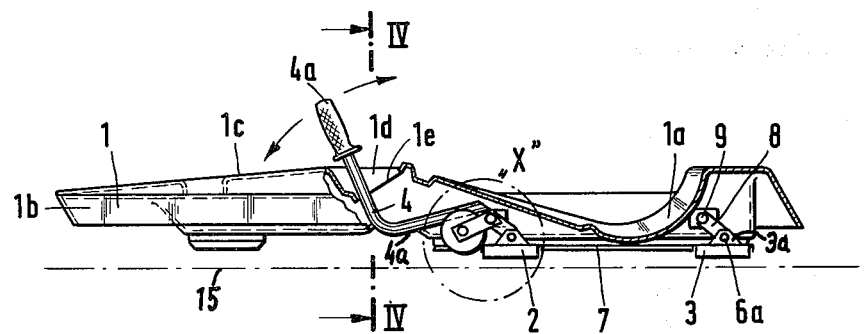
Fig.2
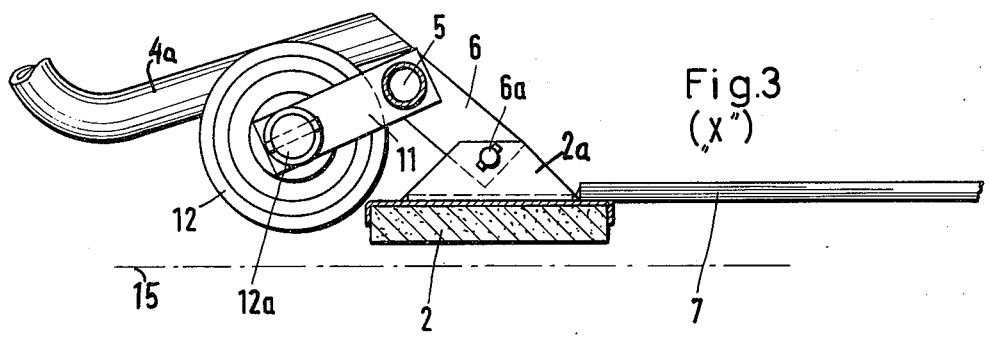
Fig.3 ("X")
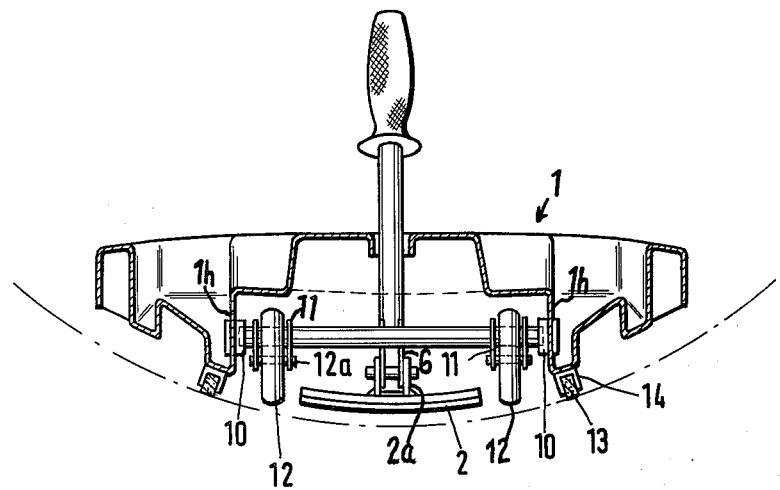
Fig.4

SLED

STATEMENT OF THE INVENTION

The invention covers a sled with two brakes, one being arranged before and one behind the seat, underneath the sled, whereby the brake shoes can be pressed down by means of a single operating lever pivoting around a horizontal axis.

BACKGROUND OF THE INVENTION

The use of simple sleds is known, of course, for sliding down short courses. They are not equipped with brakes and are not suitable for long high speed courses, where the need for stopping is important. German publication DT-OS 2 233 097 discloses a sled with a front steering runner pivoting around a horizontal axis, the rear part of which is equipped with a brake shoe which, when changing direction of the sled, is pressed down onto the surface below. The rear part of this sled is equipped with an additional brake shoe which is pressed down by tilting the seat by the operator. To operate the rear brake, therefore, the operator has to shift toward the back, which cannot always be done in difficult situations, particularly if he has not prepared for this by proper placement of the feet.

Moreover, hard and prolonged braking is impossible using this type of rear brake as the braking force causes the operator to slide forward on the seat, thus rendering the rear brake ineffective.

DETAILED DESCRIPTION OF THE INVENTION

With this invention, by contrast, a brake system for high speed sleds is provided which makes possible a controlled braking for any type of situation. This is done by connecting the front and rear brakes via a linkage, the rear brake pivoting around a torsional axle. Both brakes are operated by means of a single lever. The sled is long enough to accommmodate a person's feet so that a comfortable position can be assumed, and the desired brake effect can be obtained by more or less forceful use of the single operating lever. any unintentional shifting of weight will not affect the operation of the braking system, as the center of gravity of the operator is between the brakes, unless another position is assumed intentionally.

The brake shoes are disposed transverse to and adjacent the longitudinal axis of the sled to avoid uneven resistances on either side of the sled and lateral deflection of the path thereof. Also, the operating lever of the braking system herein is located along the same longitudinal axis of the sled, and reaches through a slot in the center longitudinal ridge. Therefore, the hands of the operator are always centered at the handle so that they cannot be hurt when bumping into an obstacle along the side.

Also, the braking system of the invention includes a linkage at the lower end of the operating lever which is a twoarm lever, with one end being the operating lever, and the other end connected rigidly to the brakes. The brake shoes are preferably substantially horizontal brake surfaces comprised of a high friction material.

For fast acceleration of the sled in situations where the brakes have been applied too hard, or when traversing a rough sliding surface, the brake system herein provides a wheel or roller at each side of the operating lever next to the front brake. These wheels are rigidly connected to the operating lever. When the wheels are rotated to engage the sliding surface by the operating lever, the sled is partially rolling. In this connection, the single operating lever of the brake system operates when pulling toward the operator to engage the dual brake shoes with the sliding surface, while pushing the same lever in the opposite direction engages the wheels or rollers to increase forward momentum.

The braking effect of the rear sliding surfaces of the sled can be considerably diminished by shifting the center of gravity over the rollers, which occurs when the operator pushes the lever forward so that fast acceleration of the sled will result. The desired direction will be kept due to the brake effect of the sliding surfaces in the rear area of the sled. The rollers are preferably made of plastic, so that they do not damage the sliding surface.

Other objects and advantages of the invention will be apparent from the following detailed description, the accompanying drawings, and the appended claims.

IN THE DRAWINGS

FIG. 2 is a longitudinal sectional view of the sled of FIG. 1, showing details of the braking system;

FIG. 3 is an enlarged view of the circled portion marked X in FIG. 2; and

FIG. 4 is a sectional view taken along lines IV—IV of FIG. 1.

Figure 1:
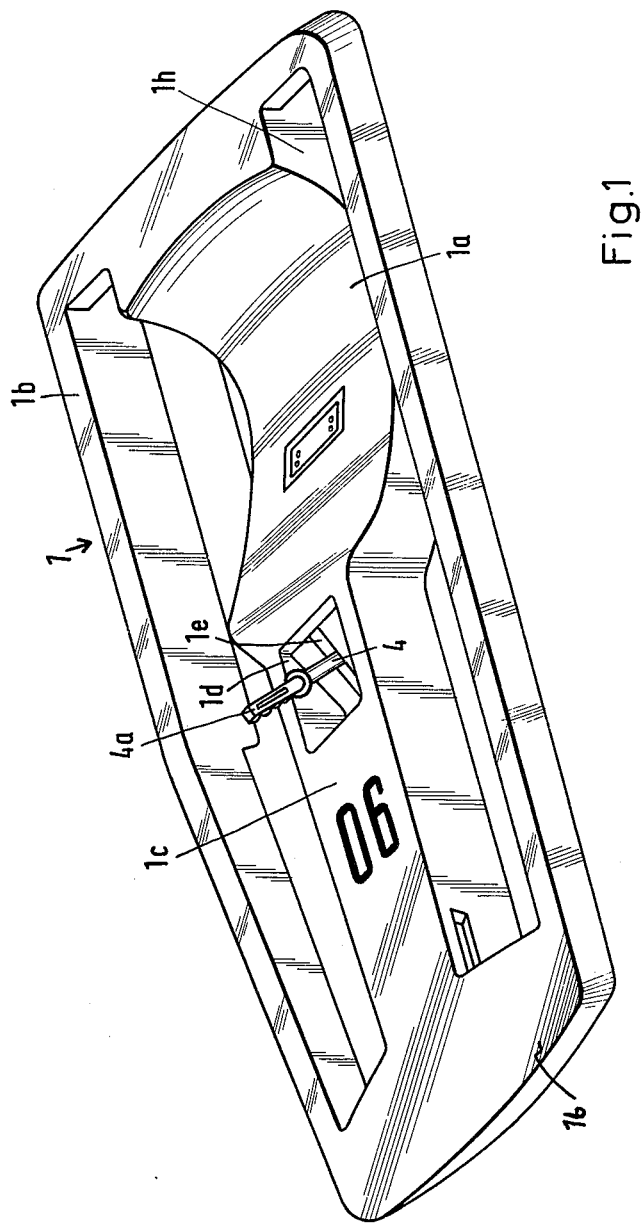
FIG. 1 is a longitudinal perspective view of a sled incorporating the braking system of the invention and embodying other aspects thereof.

Referring to the drawings in which like numbers refer to like parts throughout the several views thereof, sled 1 is equipped at the rear with seat 1a, and a circumferential ridge 1b. Seat 1a is inclined toward the front, and ends in an integral center longitudinal ridge 1c, which extends to the front part of ridge 1b. Center longitudinal ridge 1c is provided with handle trough 1d having a slot 1e. Handle 4a of operating lever 4 extends through slot 1e.

Referring now to FIGS. 2 and 3 which show the braking system of sled 1 in detail, it will be seen that operating lever 4 is elbow shaped with the lower portion 4a thereof extending rearwardly in a substantially horizontal direction. Rigidly connected to the rear end of portion 4a is a dual bearing boss 6 arranged to pivot around axle 5. Thus, operating lever 4–4a pivots around the axis of axle 5. Supporting brackets 2a of front brake shoe 2 are connected by bolt 6a to the end of boss 6 via a self-aligning rocker bearing, as will be understood. Front brake shoe 2 is rigidly connected to rear brake shoe 3 by linkage 7.

Rear axle 9 is a torsion bar and the supporting brackets 3a of rear brake shoe 3 are connected to pivot around axle 9 through inclined lever 8 via bolt 6a and a self-aligning rocker bearing in the same manner as the front brake shoe 2.

As can be seen in FIG. 4, a pair of rollers or wheels 12 are also supported from front axle 5. The axle 12a of each wheel is rigidly connected to axle 5 by dual lever arms 11. Lever arms 11 pivot around the axis of axle 5. As will be apparent, rollers 12 are not in engagement with sliding surface 15 during normal operation, but may be brought into engagement by moving or pivoting operating handle 4a forwardly and downwardly.

Referring again to FIG. 4, sled 1 is shown on slide surface 15 indicated in dot-dash line. Axles 5 and 9 are supported on sides 1h of seat 1a of sled 1 by bearings 10. In order to minimize wear and tear on the sled lower surfaces, longitudinally extending runners 13 are utilized. Runners 13 are inserted into and supported by U-shaped brackets 14. Runners 13 are replaceable so that worn ones may be replaced as needed.

As will be apparent from the foregoing, the operator of sled 1 may pull operating handle 4a toward him in order to firmly engage, simultaneously, forward brake shoe 2 and rear brake shoe 3 with sliding surface 15. Even though this braking action will cause forward thrusting of the operator, the same braking action can still be maintained without any requirement for specific body positioning, and body movement during braking will not have an effect upon the braking action. Moreover, because the center of gravity of the operator is located between the forward and rear brake shoes and because the brake shoes are located at the longitudinal axis of the sled, there is a more even braking action without lateral deflection of the sled. In this connection, it is preferred to have chevron shaped grooves, not shown, in the braking surfaces of the shoes to enhance their frictional engagement with the sliding surface.

Alternatively, if the operator discerns that he has braked too much under the conditions of the moment, or his forward momentum has otherwise decreased unduly, he may move the same single operating lever forwardly to release brake shoes 2 and 3 from firm engagement with sliding surface 15 and move rollers 12 into engagement with surface 15. This action gives the sled a partial forward rolling action to accelerate forward.

Thus, the operator of the sled, in accordance herewith, may keep both hands centered on a single operating lever to increase or decrease his forward speed under the conditions of the moment, and without having body movement affecting the desired action taken in the movement of the lever. Because the hands are centered on the lever, they are not exposed to injury along the side edges of the sled.

While the forms of apparatus herein described constitute preferred embodiments of the invention, it is to be understood that the invention is not limited to these precise forms of apparatus, and that changes may be made therein without departing from the scope of the invention, which is defined in the appended claims.

We claim:

1. A coaster-type land vehicle, comprising in combination
   a. an elongated shell-like body with a seat positioned adjacent the rear end thereof;
   b. a front brake forward of said seat;
   c. a rear brake rearward of said seat;
   d. a horizontal axle;
   e. a single operating lever pivotal around said horizontal axle, said operating lever movable in the longitudinal axis of said vehicle; the improvement characterized by
   f. said front and rear brakes having substantially horizontal braking surfaces and disposed transverse to and along the longitudinal axis of said vehicle;
   g. said operating lever having a substantially vertical portion forming the operating handle therefor, and a substantially horizontal portion extending to said axle;
   h. first connecting means rigidly connecting said horizontal portion and said front brake, said first connecting means extending rearwardly from said pivot axle;
   i. a linkage rigidly connecting said front and rear brakes;
   j. said rear brake being suspended to pivot around a torsional axis parallel with said pivotal axle;
   k. roller means; and
   l. second connecting means rigidly connecting said horizontal portion and said roller means, said second connecting means extending forwardly from said pivot axle;
   m. whereby pivoting said operating lever in one direction moves said front and rear brakes simultaneously into engagement with the vehicle sliding surface, and pivoting said operating lever in the opposite direction pivots said roller means into contact with said surface.

2. The vehicle of claim 1, further characterized by
   a. a central longitudinal ridge integral with and extending forward of said seat;
   b. a slot in said central longitudinal ridge; and
   c. said operating lever handle extending through said slot.

3. The vehicle of claim 1, further characterized by
   a. said roller means including a roller disposed adjacent each end of said front brake.

* * * * *